United States Patent
Jaynes et al.

(10) Patent No.: US 8,741,831 B2
(45) Date of Patent: Jun. 3, 2014

(54) AMPHOTERIC POLYMER FOR TREATING HARD SURFACES

(75) Inventors: Bingham Scott Jaynes, New City, NY (US); Zhiqiang Song, Newtown, CT (US); Xian-Zhi Zhou, Leonia, NJ (US); Yingxia He, Wilmington, DE (US)

(73) Assignee: BASF SE, Ludwigshafen (DE)

( * ) Notice: Subject to any disclaimer, the term of this patent is extended or adjusted under 35 U.S.C. 154(b) by 652 days.

(21) Appl. No.: 12/489,853

(22) Filed: Jun. 23, 2009

(65) Prior Publication Data

US 2009/0324964 A1 Dec. 31, 2009

Related U.S. Application Data

(60) Provisional application No. 61/133,460, filed on Jun. 30, 2008.

(51) Int. Cl.
*C11D 3/37* (2006.01)

(52) U.S. Cl.
USPC ........... 510/475; 510/362; 510/433; 510/405; 510/403; 524/555; 526/303.1; 526/317.1; 526/335

(58) Field of Classification Search
USPC .......... 510/475, 362, 433, 405, 403; 524/555; 526/303.1, 317.1, 335
See application file for complete search history.

(56) References Cited

U.S. PATENT DOCUMENTS

| | | |
|---|---|---|
| 5,008,030 A | 4/1991 | Cook et al. |
| 5,275,809 A * | 1/1994 | Chen et al. ................. 424/70.16 |
| 6,593,288 B2 * | 7/2003 | Aubay et al. ................... 510/504 |
| 6,664,218 B1 | 12/2003 | Dastbaz et al. |
| 6,767,410 B2 | 7/2004 | Aubay et al. |
| 6,924,260 B2 | 8/2005 | Aubay et al. |
| 6,926,745 B2 | 8/2005 | Scheuing et al. |
| 7,422,735 B1 * | 9/2008 | Hossel et al. .............. 424/70.15 |
| 7,591,272 B2 * | 9/2009 | Dastbaz et al. .............. 134/25.2 |
| 7,659,354 B2 * | 2/2010 | Song et al. ..................... 526/307 |
| 2003/0083223 A1 | 5/2003 | Aubay et al. |
| 2005/0261394 A1 * | 11/2005 | Branston et al. .............. 523/160 |
| 2007/0105737 A1 | 5/2007 | Dastbaz et al. |
| 2009/0117071 A1 | 5/2009 | Song et al. |
| 2009/0264332 A1 | 10/2009 | Yoshikawa et al. |
| 2010/0240563 A1 * | 9/2010 | Jaynes et al. .................. 510/180 |

FOREIGN PATENT DOCUMENTS

| | | |
|---|---|---|
| EP | 0467472 | 7/1991 |
| EP | 0522756 | 6/1992 |
| JP | 09166995 | 6/1997 |
| JP | 2007099811 | 4/2007 |
| WO | WO 2004056888 A2 * | 7/2004 |
| WO | 2007017098 | 2/2007 |

OTHER PUBLICATIONS

International Search Report dated Feb. 22, 2010. References EP0522756 and WO2007/017098 were previously cited.

* cited by examiner

*Primary Examiner* — Satya Sastri
(74) *Attorney, Agent, or Firm* — Shiela A. Loggins

(57) ABSTRACT

The present invention is directed to the use of hydrophilic terpolymers in hard surface cleaners which provide easier cleaning for surface soils such as hard water stains, soap scum, limescale, mud, food, toilet stains, oil, grease, particulates and the like as well as anti-fog effects on hard surfaces such as glass, mirrors, ceramic and plastic by causing water droplets to coalesce into a film.

16 Claims, No Drawings

AMPHOTERIC POLYMER FOR TREATING HARD SURFACES

This application claims the benefit of Provisional Application No 61/133,460, filed Jun. 30, 2008, herein incorporated entirely by reference.

The present invention is directed to the use of novel surface cleaning formulations that contain water soluble hydrophilic polymers such that the formulation provides easier cleaning for surface soils such as hard water stains, soap scum, limescale, mud, food, toilet stains, oil, grease, particulates and the like. The compositions also provide anti-fog effects on hard surfaces such as glass, mirrors, ceramic and plastic by causing water droplets to coalesce into a film.

BACKGROUND ART

Aqueous formulations incorporating hydrophilic polymers and their use in hard surface cleaners are well known in the art. Hydrophilic polymers are known to provide anti-soiling and re-cleaning benefits on common household hard surfaces by imparting soil release properties thereto which facilitate subsequent cleaning.

For example, European Application No. 0467472 and U.S. Pat. Nos. 5,008,030, 6,926,745 describe hydrophilic polymers and their use in hard surface cleaners. The polymers described therein are cationic and are formed from trialkylammonium ethyl methacrylates.

Additionally, amphoteric polymers are also known to impart various benefits to hard surface cleaning compositions. U.S. Pat. No. 6,664,218 teaches amphoteric copolymers of diallyl dimethyl ammonium in combination with zwitterionic surfactants.

European Application No. 0522756 teaches the use of amphoteric polymers in hand dishwashing compositions.

Japanese Application No. 09-169995 teaches the use of acrylic acid/diallydimethylammonium copolymers for cleaning toilets.

U.S. Pat. Nos. 6,593,288, 6,767,410, 6,924,260 and PCT Application No. 2007/017098 teach amphoteric copolymers of diallyldimethyl ammonium and allege the importance of amphoterics which are characterized by an excess anionic charge.

U.S. Publication Application No. 2007/0105737 teaches the use of amphoterics exhibiting an excess anionic charge in combination with an acid to remove soap scum and limescale.

Fogging of surfaces arises when relatively cool non-porous surfaces are exposed to a warm moist atmosphere, since the cool surface will become fogged. In particular, glass fogging occurs by the condensation of steam or water vapor when the surface temperature of the non-porous surface is below the dewpoint. The opaque fog is therefore caused by the condensation of moisture droplets onto the non-porous surface. Naturally, this is undesirable for windows, mirrors, face masks, spectacles and the like.

One of the methods of avoiding fogging includes treating the non-porous surface with hydrophilic chemicals that tend to decrease the incidence of droplet formation. In general, hydrophilic chemicals are surface active agents which reduce the surface tension of the glass and encourage the individual water droplets to coalesce into a sheet.

U.S. Pat. No. 6,767,410 recognizes the ability of amphoteric copolymers with excess anionic charge to provide an anti-misting capability on surfaces such as glass. However, the described copolymers are not compatible in acidic systems.

Although multiple hydrophilic polymers, including amphoteric polymers have been described in the literature, there still exists a need for hydrophilic polymers which show compatibility in both basic and acidic hard surface cleaning formulations. Furthermore, it would be a great advantage if the said amphoteric polymers provided not only easier cleaning for surface soils such as hard water stains, soap scum, mud, food, toilet stains, oil, grease, particulates and the like but also simultaneously provided a long lasting anti-fog effect for said hard surfaces.

The present inventors have discovered particular hydrophilic terpolymers which are compatible in basic and acidic formulations which provide excellent hard surface cleaning capabilities such as soap scum removal and anti-fog effects is described in detail below.

The cleaning formulations incorporating the terpolymer form a film on the hard surface during the cleaning step which provides both a soil release and a soil resistant effect. Cleaning products containing these polymers will provide significant consumer benefit over existing products without soil release technology.

As mentioned above a particular advantage of these materials is their compatibility with a wide range of cleaning formulations, both acidic and basic, containing cationic, anionic or nonionic surfactants. Other commercially available polymers for surface cleaning formulations are often limited to specific cleaning formulation types and are not universally compatible.

The new materials provide a unique balance of cationic, anionic and hydrophilic properties to provide optimal cleaning performance. The materials are compatible in most types of cleaning formulations as a result of their low overall charge level. The slight excess of cationic charge allows them to bind to the surfaces being treated so that the materials create a semi-durable film that is stable to rinsing, yet will not cause long term build-up of residue. The hydrophilic nature of the materials provides excellent soil repellency and removal effects, as well as beneficial anti-fogging properties for windows, mirrors and other hard surfaces. The structure of the polymer also allows the properties of the polymer to be readily tuned to be appropriate for any type of cleaning formulation required.

SUMMARY OF THE INVENTION

The present invention is directed to both compositional and method embodiments. The invention embodies several compositional embodiments. The first is directed to a hard surface cleaning composition and the second is directed to a fog preventing film on a nonporous substrate.

Firstly, the invention embodies a hard surface cleaning composition comprising a terpolymer formed from at least one monomer having the following structure (I):

a)

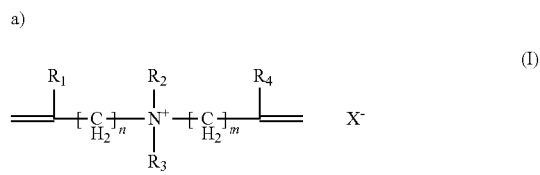

wherein $R_1$ and $R_4$ independently represent a hydrogen atom or a linear or branched $C_1$-$C_6$ alkyl group:

$R_2$ and $R_3$ independently represent an alkyl, hydroxyalkyl or amino alkyl group in which the alkyl group is a linear or branched $C_1$-$C_6$ chain;

n and m independently represent integers between 1 and 3;

$X^-$ represents a counterion;

b) at least one hydrophilic monomer bearing a function of acidic nature which is copolymerizable with (a) and capable of ionizing in the application medium, c) at least one hydrophilic monomer compound containing ethylenic unsaturation and of neutral charge, bearing one or more hydrophilic groups, which is copolymerizable with (a) and (b);

and d) optionally, a crosslinking agent, wherein monomer c) makes up at least 60 weight % based on the total weight of the formed terpolymer and the molar ratio of monomer a) to monomer b) is optionally greater than one resulting in a terpolymer with an excess cationic charge.

Secondly, the invention embodies a fog preventive film, wherein the film is present on a nonporous substrate and the film composition comprises the terpolymer described above.

The method embodiments envisioned are directed to the cleaning of hard surfaces, the removal of limescale and soap scum in particular and the application of fog preventing films on nonporous substrates.

A method of cleaning a hard surface comprising applying a cleaning composition to a hard surface and rinsing the cleaning composition from the surface, wherein the cleaning composition comprises the terpolymer described above.

A method of removing limescale and soap scum from a surface comprising applying a cleaning composition to a hard surface and rinsing the cleaning composition from the surface, wherein the cleaning composition comprises the terpolymer described above.

A method of making a nonporous surface fog resistant which method comprises the steps of applying an aqueous composition to said surface to obtain a film which aqueous composition comprises a terpolymer formed from at least one first monomer having the following structure (1):

a)

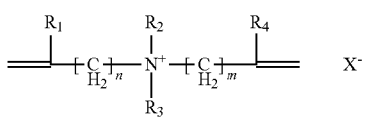

(I)

wherein $R_1$ and $R_4$ independently represent a hydrogen atom or a linear or branched $C_1$-$C_6$ alkyl group:

$R_2$ and $R_3$ independently represent an alkyl, hydroxyalkyl or amino alkyl group in which the alkyl group is a linear or branched $C_1$-$C_6$ chain;

n and m independently represent integers between 1 and 3;

$X^-$ represents a counter-ion;

b) at least one hydrophilic monomer bearing a function of acidic nature which is copolymerizable with (a) and capable of ionizing in the application medium, c) at least one hydrophilic monomer compound containing ethylenic unsaturation and of neutral charge, bearing one or more hydrophilic groups, which is copolymerizable with (a) and (b);

and d) optionally, a crosslinking agent, wherein monomer c) makes up at least 60 weight % based on the total weight of the formed terpolymer and optionally, rinsing the film from said surface, wherein the molar ratio of monomer a) to monomer b) is optionally greater than one resulting in a terpolymer with an excess cationic charge.

The film formed by applying the aqueous composition will for example be transparent.

DETAILED DESCRIPTION OF THE INVENTION

Definition of Terms

All percentages unless specified otherwise are based on total weight.

The term (meth)acylic refers to both acrylic and methacrylic derivatives.

The term "monomer" as used herein means an ethylenically unsaturated compound capable of polymerizing.

Once the monomer is polymerized it becomes part of a polymer or in the instant case, part of the terpolymer. Once polymerized the monomer becomes a "monomer unit" of the formed polymer.

Any references to molecular weight will normally mean average molecular weight and will be expressed in Daltons.

Amphoteric for purposes of the invention means that the terpolymer exhibits both cationic and anionic charges. The cationic charges are derived from monomer a) and the anionic charges are derived from monomer b). It is also possible that should the component c) be acrylamide, it may to some extent hydrolyze forming acid moieties.

Terpolymer for purposes of the invention means a polymer formed from at least 3 different monomers.

The terpolymer may consist of components a), b) and c) and optionally a crosslinking agent. Thus the terpolymer may be entirely formed from only components a), b), c) and d) as described above or alternatively, may also comprise additional monomers.

A terpolymer exhibiting excess cationic charge means that the molar amount of monomer a) will exceed the molar amount of monomer b). The terpolymer when dispersed or dissolved within the hard surface cleaner or anti fog composition will normally retain this excess cationic charge in the medium of use.

If the terpolymer exhibits excess anionic charge this means that the molar amount of monomer b) will exceed the molar amount of monomer a). The terpolymer when dispersed or dissolved within a neutral or alkaline formulation the hard surface cleaner or anti fog composition will normally retain this excess anionic charge in the medium of use.

Hard surfaces for purposes of the invention means surfaces such as ceramic, stone, brick, glass, plastic, wood, laminate, vinyl, composite and the like.

For example, kitchen tableware cleaned by machine or by hand, windows, ceramics (bathrooms, sinks, toilet bowls), shower walls, mirrors and glass substrates may be considered hard surfaces.

Surfaces especially appropriate for application of the fog preventive film are nonporous surfaces such as glass and mirrors.

Hydrophilic monomers for purposes of the invention means that the monomer has a strong tendency to bond with water, which can result in an aqueous solution of the monomer. This property is characteristic of monomers which contain polar or ionic functionality.

The hydrophilic monomer or monomers will for example be soluble in water (at 20° C.) at a concentration of 1, 2 or 3 wt. % or greater.

Terpolymer

Monomer a) has the following structure (I)

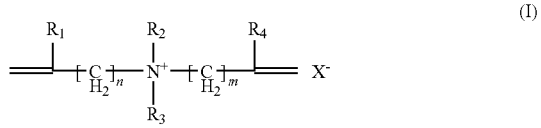

wherein
$R_1$ and $R_4$ independently represent a hydrogen atom or a linear or branched $C_1$-$C_6$ alkyl group:
$R_2$ and $R_3$ independently represent an alkyl, hydroxyalkyl or amino alkyl group in which the alkyl group is a linear or branched $C_1$-$C_6$ chain;
n and m independently represent integers between 1 and 3;
$X^-$ represents a counter-ion.

Linear or branched $C_1$-$C_6$ alkyl is for example, methyl, ethyl, propyl, isopropyl, n-butyl, sec-butyl, iso-butyl, tert-butyl, pentyl and hexyl.

Hydroxyalkyl is for example hydroxymethyl, hydroxyethyl, hydroxypropyl, hydroxybutyl, hydroxypentyl and hydroxyhexyl, wherein the hydroxy substitution may occur anywhere on the alkyl chain. The $C_1$-$C_6$ alkyl may be branched or unbranched as defined above.

Amino alkyl is analogously defined as the hydroxyalkyl except the $C_1$-$C_6$ alkyl is substituted by amine. The amine substitution may occur anywhere on the alkyl chain and the $C_1$-$C_6$ alkyl chain may be branched or unbranched.

The counterion may be virtually any counterion such as halogens including fluoride, chloride, bromide and iodide, sulfate or phosphate.

The preferred specific monomers of formula (I) are for example diallydialkylammonium monomers. Those commonly available include diallyldimethylammonium chloride (DADMAC), diallyldimethylammonium bromide, diallydimethylammonlum sulfate, diallydimethylammonium phosphate, dimethyallydimethyammonium chloride, diethylallyldimethylammonium chloride, diallyldi(beta-hydroxyethyl)ammonium chloride and diallyidiethylammonium chloride.

It is important that the present terpolymer comprise at least 2, 3, 4 or 5 wt. % of monomer units formed from the monomer described by structure (I) based on the total weight of the terpolymer. For example, the terpolymer may comprise at least 5, 6, 7, 8, 9, 10, 11, 12, 13, 14, 15, 16, 17, 18, 19, 20, 21, 22, 23, 24, 25, 26, 27, 28, 29, or 30 wt. % based on the total terpolymer weight.

For example, the terpolymer may be formed from at least 2 wt. % to 35 wt. %, preferably 10 wt. % to 30 wt. %, and most preferably 15 wt. % to 30 wt.% of monomer units formed from the monomer described by structure (I) based on the total weight of the terpolymer.

Monomer b) is at least one hydrophilic monomer bearing an acidic group which is copolymerizable with (a) and capable of ionizing in the application medium.

The monomers (b) are advantageously water-soluble $C_3$-$C_8$ carboxylic, sulfonic, sulfuric, phosphonic or phosphoric acids containing monoethylenic unsaturation, anhydrides thereof and water-soluble salts thereof.

Among the preferred monomers (b) which may be mentioned are acrylic acid, methacrylic acid, .alpha.-ethacrylic acid, .beta., .beta.-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylaianine, N-acryloylhydroxyglycine, sulfopropyl acrylate, sulfoethyl acrylate, sulfoethyl methacrylate, sulfoethyl methacrylate, 2-acrylamido-2-methylpropane sulfonic acid (AMPS), styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the ammonium and alkali metal salts of these acids.

Preferable hydrophilic monomers bearing an acidic functionality are acrylic acid or methacrylic acid.

Component b) monomer may make up at least about 0.1 to about 20, about 0.5 to about 15, about 0.7 to about 12, about 1 to about 8 wt. % of the total polymer. Most typically the anionic component b) will be a minimum of about 2, 3 or 4 wt. percent of the total weight of the formed polymer with a maximum of about 5, 10, 15, or 20 wt. %.

The amount of the monomer of component b) will for example, be about 0.4 wt. % to about 10 wt. %, about 1.0 to about 8 wt. % or about 2.0 to about 7 wt. % or the formed terpolymer.

The molar amount of monomer b) will for example be less or greater than the molar amount of monomer a). For example, the molar ratio of a) to b) will range from 1.1:1 to 5:1, 1.1:1 to 4:1, more typically 1.1:1 to 3:1 or 1.1:1 to 2:1. Alternatively, for example, the molar ratio of a) to b) will range from 1:1.1 to 1:5, 1:1.1 to 1:4, more typically 1:1.1 to 1:3 or 1:1.1 to 1:2.

Another way of expressing the molar relationship between components a) and b) is to say that component a) will for example exceed the molar amount of component b) incorporated into the terpolymer by at least 10 molar %. Alternatively, component b) will for example exceed the molar amount of component a) incorporated into the terpolymer by no more than 10% or 15 molar %.

For example, if 10 moles of monomer a) is incorporated into the terpolymer then monomer b) will comprise no more than 9 moles of the terpolymer. Alternatively, if 10 moles of monomer b) is incorporated into the terpolymer than monomer a) will comprise no more than 9 moles of the terpolymer.

The total molar incorporation of monomer a) may for example be at least 10% greater, preferably at least 15% greater, more preferably at least 20% greater, and most preferably at least 25% greater than the molar incorporation of monomer b) in the formed terpolymer.

Another way of looking at the molar ratio of a) to b) is to determine the net charge of the terpolymer. For example, the cationic net charge on the terpolymer may range for example from about −0.10 to about 1.5, about 0.0 to about 1.5, about 0.1 to about 0.8, or about 0.1 to about 0.5 meq/g.

Monomer c) is at least one hydrophilic monomer compound containing ethylenic unsaturation and of neutral charge, bearing one or more hydrophilic groups, which is copolymerizable with (a) and (b).

Among the monomers (c) which may be mentioned are (meth)acrylamide, N-methylacrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters.

Preferably monomer c) is for example, selected from the group consisting of acrylamide, methacrylamide and N-methyl (meth)acrylamide.

Monomer b) may make up for example, about 1, 2, 3, 4, 5, 6, 7, 8, 9 or 10 wt. % based on the total weight of the terpolymer. The molar amount of monomer a) may for example exceeds that of monomer b).

For example, the wt. % of monomer b) makes up at least 1 wt. % to 10 wt. %, preferably 1.5 wt. % to 8 wt. % and most preferably 2.0 wt. % to 6 wt. % of the formed terpolymer.

Monomer c) will make up at least 60, 65, 70, 75, 80, 85, 90 or 95 weight percent of the total weight of the terpolymer. For example monomer units formed from acrylamide may range from 60 to 95, 65 to 95, 70 to 95 and 70 to 90 weight percent of the total weight of the terpolymer.

The total weight of the charged monomers (components a) and b) will then by definition of the above content of acrylamide be about 40 to about 5, 35 to 5, 30 to 5, 25 to 5, 20 to 5, 15 to 5 or 10 to 5 weight percent of the total weight of the terpolymer.

It is believed that the incorporation of a large wt. % of monomer c) makes the formation of a higher average molecular weight more easily attainable and improves the water solubility of the formed terpolymer thus making the terpolymer more compatible with both acidic and basic cleaning formulations.

The polymer may be formed from 100 wt. % a), b) and c).

The terpolymers of the invention may optionally contain a crosslinker d). Crosslinked means that the terpolymer may additionally contain comonomers having multi-ethylenic unsaturation other than monomers of formula (I).

Typical crosslinkers are methylenebisacrylamide (MBA); methylenebismethacrylamide; esters of unsaturated monocarboxylic and polycarboxylic acids with polyols, diacrylates and triacrylates, dimethacrylates and trimethacrylates, butanediol and ethylene glycol diacrylate and methacrylate, diethylene glycol diacrylate, poly(ethylene glycol) diacrylate, poly(propylene glycol) diacrylate, tetrallylammonium chloride (TAAC), trimethylolpropane triacrylate (TMPTA), penta erithritol triacrylate (PETA) and trimethylolpropane trimethacrylate (TMPTMA). Allyl compounds may also be considered such as allyl (meth)acrylate, triallyl cyanurate, diallyl maleate, polyallyl esters, tetraallyloxyethane, triallylamine, tetraallylethylenediamine; allyl esters of phosphoric acid; and/or vinylphosphonic acid derivatives.

The crosslinkers are for example at least difunctional ethylenic unsaturated monomers and will be added during the formation of the terpolymer at amounts that range from 20 to 10,000 ppm of the total monomer content. For example, 20 to 1000 ppm, 50 to 800 ppm or 75 to 600 ppm are envisioned.

Some particularly preferred crosslinkers are methylenebisacrylamide (MBA); methylenebismethacrylamide.

The weight fraction of crosslinking comonomers, based on the total mass of the copolymers, is not more than 5%, 3% or 2% by weight, more typically from 0.00002 to 2% by weight, and most preferably from 0.00002 to 1% by weight.

Average Molecular Weight

The above formed terpolymer is further characterized by an average molecular weight ranging from 10,000 to 10,000,000. For example 20,000 to 1,000,000, 40,000 to 800,000 and 20,000 to 500,000 are envisioned.

The average molecular weight is determined by standard GPC using polyethylene glycol columns.

Synthesis of Terpolymers

The terpolymers used in the hard surface cleaners are made by standard solution polymerization (aqueous).

The present terpolymers of the invention are water soluble or water dispersible.

Water-soluble terpolymers for purposes of the invention means the polymer forms a clear solution at the range of use.

The copolymers of the invention can be obtained according to the known techniques for preparing copolymers, in particular by radical-mediated polymerization of the ethylenically unsaturated starting monomers which are known compounds or which can readily be obtained by a person skilled in the art using conventional synthetic processes of organic chemistry.

The radical-mediated polymerization is preferably carried out in an oxygen-free environment, for example in the presence of an inert gas (helium, argon, etc.) or nitrogen. The reaction is carried out in an inert solvent, preferably methanol or ethanol, and more preferably in water.

The polymerization is initiated by adding a polymerization initiator. The initiators used are the free-radical initiators usually used in the art. Examples comprise organic peresters (t-butyl peroxypivalate, t-amyl peroxypivalate, t-butyl peroxy-.alpha.-ethylhexanoate, etc.); organic compounds of azo type, for example azobisamidinopropane hydrochloride, azobisisobutyronitrile, azobis(2,4-dimethyl-valeronitrile, etc.); inorganic and organic peroxides, for example hydrogen peroxide, benzyl peroxide and butyl peroxide, etc; redox initiator systems, for example those comprising oxidizing agents, such as persulfates (in particular ammonium or alkali metal persulfates, etc.); chlorates and bromates (including inorganic or organic chlorates and/or bromates); reducing agents such as sulfites and bisulfites (including inorganic and/or organic sulfites or bisulfites); oxalic acid and ascorbic acid, as well as mixtures of two or more of these compounds.

The preferred initiators are water-soluble initiators. Sodium persulfate and azobisamidinopropane hydrochloride are particularly preferred.

As a variant, the polymerization can be initiated by irradiation with ultraviolet light. The amount of initiators used is generally an amount which may be sufficient for initiating the polymerization. The initiators are preferably present in an amount ranging from 0.001% to approximately 10% by weight relative to the total weight of the monomers, and are preferably in an amount of less than 0.5% by weight relative to the total weight of the monomers, a preferred amount being in the range from 0.005% to 0.5% by weight relative to the total weight of the monomers. The initiator is added to the polymerization mixture in a continuous or batchwise manner.

The reaction may be run at about 50° C. to about 125° C., preferably about 60° C. to about 120° C., and most especially about 80° C. to about 110° C.

The total reaction time may vary from 1 to about 10 hours.

The Cleaning Formulation

The compositions of the present invention usually comprise an aqueous liquid carrier that includes water and optionally one or more organic solvents. Water typically comprises from about 50% to about 100%, for example about 60% to about 98%, from about 80% to about 96% of the aqueous carrier, with the optional solvent forming the balance. Deionized or softened water is preferred.

The solvent is typically used to dissolve various components in the improved cleaning composition so as to form a substantially uniformly dispersed mixture. The solvent can also function as (i) a cleaning agent to loosen and solubilize greasy or oily soils from surfaces, (ii) a residue inhibiting agent to reduce residues left behind on a cleaned surface, (iii) a detergent agent, and/or (iv) a disinfecting, sanitizing, and/or sterilizing agent.

The solvent, when used, can be premixed with the other components of the cleaning composition or be partially or fully added to the improved cleaning composition prior to use. The solvent may be water soluble and/or it is a water dispersable organic solvent. The solvent can be selected to have the desired volatility depending on the cleaning application.

Suitable solvents include, but are not limited to, $C_{1-6}$ alkanols, $C_{1-6}$ diols, $C_{1-10}$ alkyl ethers of alkylene glycols, $C_{3-24}$ alkylene glycol ethers, polyalkylene glycols, short chain carboxylic acids, short chain esters, isoparafinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, propylene glycol n-propyl ether, propylene glycol monobutyl ether, propylene glycol t-butyl ether, diethylene glycol monoethyl or monopropyl or monobutyl ether, di- or tri-polypropylene glycol methyl or ethyl or propyl or butyl ether, acetate and propionate esters of glycol ethers. Short chain carboxylic acids include, but are not limited to, acetic acid, glycolic acid, lactic acid and propionic acid. Short chain esters include, but are not limited to, glycol acetate, and cyclic or linear volatile methylsiloxanes. Water insoluble solvents such as isoparafinic hydrocarbons, mineral spirits, alkylaromatics, terpenoids, terpenoid derivatives, terpenes, and terpene derivatives can be mixed with a water soluble solvent when employed.

The polymer of the present invention is added to the formulation at a level of between approximately 0.01% and 5%, for example 0.1% to 3%, 0.2% to 2%, 0.3% to 1.5% such that the terpolymer is dissolved or is uniformly dispersed.

One of the particular advantages of the terpolymer is its ease of incorporation into both acidic and basic formulations. For example, 0.4, 0.5, 0.6 wt. % is easily added to the basic or acidic formulation without precipitation.

The cleaning composition may include an effective amount of surfactant for improving the cleaning performance, stabilizing the cleaning composition and emulsifying the cleaning components. Conventional nonionic, anionic, cationic, zwitterionic, and/or amphoteric surfactants can be employed. Suitable surfactants are described in *McCutcheon's Emulsifiers and Detergents* (1997), Kirk-Othmer, Encyclopedia of Chemical Technology, 3rd Ed., Volume 22, pp. 332-432 (Marcel-Dekker, 1983), and *McCutcheon's Soaps and Detergents* (N. Amer. 1984), which are incorporated herein by reference.

Suitable surfactants include, but are not limited to, glycoside, glycols, ethylene oxide and mixed ethylene oxide/propylene oxide adducts of alkylphenols and alcohols, the ethylene oxide and mixed ethylene oxide/propylene oxide adducts of long chain alcohols or of fatty acids, mixed ethylene oxide/propylene oxide block copolymers, esters of fatty acids and hydrophilic alcohols, sorbitan monooleates, alkanolamides, soaps, alkylbenzene sulfonates, olefin sulfonates, paraffin sulfonates, propionic acid derivatives, alcohol and alcohol ether sulfates, phosphate esters, amines, amine oxides, alkyl sulfates, alkyl ether sulfates, sarcosinates, sulfoacetates, sulfosuccinates, cocoamphocarboxy glycinate, salts of higher acyl esters of isethionic acid, salts of higher acyl derivatives of taurine or methyltaurine, phenol poly ether sulfates, higher acyl derivatives of glycine and methylglycine, alkyl aryl polyether alcohols, salts of higher alkyl substituted imadazolinium dicarboxylic acids, tannics, naphthosulfonates, monochloracetics anthraflavinics, hippurics, anthranilics, naphthoics, phthalics, carboxylic acid salts, acrylic acids, phosphates, alkylamine ethoxylates, ethylenediamine alkoxylates, betaines, sulfobetaines, and imidazolines.

Lauryl sulfate, laurylether sulfate, cocamidopropylbetaine, alkyl polyglycosides, and amine oxides can also be employed as surfactants. The amine oxides can be ethoxylated and/or propoxylated. One specific amine oxide includes, but is not limited to, alkyl di (hydroxy lower alkyl) amine oxides, alkylamidopropyl di (lower alkyl) amine oxides, alkyl di (lower alkyl) amine oxides, and/or alkylmorpholine oxides, wherein the alkyl group has 5-25 carbons and can be branched, unbranched, saturated, and/or unsaturated. Nonlimiting examples of amine oxides include, but are not limited to, lauryldimethylamine oxide.

Surfactants may also include ethoxylated alcohols having an alkyl group typically with 6-22 carbons; the alkyl group is preferably linear but could be branched. Furthermore, the carbon groups can be saturated or unsaturated. Suitable ethoxylated alcohols include the SURFONIC L series surfactants by Huntsman. Fluorosurfactants can also be used as the surfactant. A suitable fluorosurfactant is an ethoxylated noninoic fluorosurfactant. Suitable ethoxylated noninoic fluorosurfactants include the ZONYL surfactants by DuPont.

Cationic surfactants are, in particular, alkylammonium salts of formula

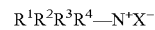

where $X^-$ represents a halide, $CH_3SO_4^-$ or $C_2H_5SO_4^-$ ion $R_1$ and $R_2$ are alike or different and represent a $C_1$-$C_{20}$ alkyl radical or an aryl or benzyl radical $R_3$ and $R_4$ are alike or different and represent a $C_1$-$C_{20}$ alkyl radical, an aryl or benzyl radical or an ethylene oxide and/or propylene oxide condensate $(CH_2CH_2O)_x$—$(CH_2CHCH_3O)_y$—H, where x and y range from 0 to 30 and are never simultaneously zero, such as cetyltrimethylammonium bromide.

Other examples include alkyl quaternary ammonium compounds which contain at least two nitrogen-bonded alkyl chains having at least about 16 carbon atoms such as distearyldiammonium chloride and ditallowdiammonium chloride; $C_8$ to $C_{18}$ fatty alkyl amines, amidoalkylamines and amidoalkanolamines, and their salts; ethoxylated amines; amine oxides; and immidazoline.

Typically the surfactant is partially or fully soluble in water. When employed, the surfactant comprises at least about 0.001% and typically 0.01-10% of the cleaning composition. The amount of surfactant may exceed 10% when the cleaning composition is formulated in concentrate. Preferably, the surfactant content is about 0.1-2%.

Antimicrobial Agent

An antimicrobial agent can also be included in the cleaning composition. Non-limiting examples of useful quaternary compounds that function as antimicrobial agents include benzalkonium chlorides and/or substituted benzalkonium chlorides, di($C_6$-$C_{14}$)alkyl di short chain (($C_{1-4}$ alkyl and/or hydroxyalkl) quaternary ammonium salts, N-(3-chloroallyl) hexaminium chlorides, benzethonium chloride, methylbenzethonium chloride, and cetylpyridinium chloride. The quaternary compounds useful as cationic antimicrobial actives are preferably selected from the group consisting of dialkyldimethyl ammonium chlorides, alkyldimethylbenzylammonium chlorides, dialkylmethylbenzylammonium chlorides, and mixtures thereof. Biguanide antimicrobial actives including, but not limited to polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are especially preferred. Typical concentrations for biocidal effectiveness of these quaternary compounds, especially in the preferred low-surfactant compositions herein, range from about 0.001% to about 0.8% and preferably from about 0.005% to about 0.3% of the usage composition. The weight percentage ranges for the biguanide and/or quat compounds in the cleaning composition is selected to disinfect, sanitize, and/or sterilize most common household and industrial surfaces.

Non-quaternary biocides are also useful in the present compositions. Such biocides can include, but are not limited to, alcohols, peroxides, boric acid and borates, chlorinated hydrocarbons, organometallics, halogen-releasing compounds, mercury compounds, metallic salts, pine oil, organic sulfur compounds, iodine compounds, silver nitrate, quaternary phosphate compounds, and phenolics.

Preferred antimicrobial agents also include organic acids, such as, acetic, lactic, sulfamic and glycolic acids.

Builder/Buffer

The cleaning composition may include a builder detergent which increase the effectiveness of the surfactant. The builder detergent can also function as a softener and/or a sequestering and buffering agent in the cleaning composition. A variety of builder detergents can be used and they include, but are not limited to, phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxysulfonates, and starch derivatives.

Builder detergents can also include polyacetates and polycarboxylates. The polyacetate and polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builder detergents can also exist either partially or totally in the hydrogen ion form.

The builder agent can include sodium and/or potassium salts of EDTA and substituted ammonium salts. The substituted ammonium salts include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

Buffering and pH adjusting agents such as acids and bases, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2methylpropanol. Preferred buffering agents for compositions of this invention are nitrogen-containing materials. Some examples are amino acids such as lysine or lower alcohol amines like mono-, di-, and tri-ethanolamine. Other preferred nitrogen-containing buffering agents are tri(hydroxymethyl)amino methane $(HOCH_2)_3CNH_3$ (TRIS), 2-amino-2-ethyl-1,3-propanediol, 2-amino-2-methyl-propanol, 2-amino-2-methyl-1,3-propanol, disodium glutamate, N-methyl diethanolarnide, 2-dimethylamino-2-methylpropanol (DMAMP), 1,3-bis (methylamine)-cyclohexane, 1,3-diamino-propanol N,N'-tetra-methyl-1,3-diamino-2-propanol, N,N-bis(2-hydroxyethyl)glycine(bicine) and N-tris(hydroxymethyl)methyl glycine(tricine). Other suitable buffers include ammonium carbarnate, citric acid, acetic acid. Mixtures of any of the above are also acceptable. Useful inorganic buffers/alkalinity sources include ammonia, the alkali metal carbonates and alkali metal phosphates, e.g., sodium carbonate, sodium polyphosphate. For additional buffers see *McCutcheon's Emulsifiers and Detergents*, North American Edition, 1997, McCutcheon Division, MC Publishing Company Kirk and WO 95/07971 both of which are incorporated herein by reference.

When employed, the builder detergent comprises at least about 0.001% and typically about 0.01-5% of the cleaning composition. The amount of the builder detergent may exceed about 5% when the cleaning composition is formulated as a concentrate. Preferably, the builder detergent content is about 0.01-2%.

Cleaning compositions for removing soap scum and limescale may for example include an acid and thus will have an pH below 7, in some embodiments below about 4 and in some embodiments below about 3. The acids to be used have to be strong enough to lower the pH a desired. They can be organic or inorganic, or a mixture thereof.

Representative of the various organic acids are citric acid, lactic acid, maleic acid, malic acid, glycolic acid, succinic acid, glutaric acide, adiplic acid and mixture thereof. Representative of the various inorganic acids that can be used are sulphuric acid, sulfamic acid, chlorhydric acid, phosphoric acid, nitric acid and mixtures thereof.

Cleaning compositions or compositions suitable for use on nonporous hard surfaces such as glass or mirrors and effective for applying an anti fog film onto the nonporous surface, may for example also include basic substances. Thus the composition will have a pH above 7, in some embodiments above 8 or 9, and in some cases as high as 10 and above.

Suitable bases include sodium, potassium, lithium, and ammonium hydroxides and amines. Alkanolamines are also envisioned such as diethanolisopropanolamine and diglycoldiisopropanolamine.

Surprisingly the present terpolymer when incorporated in either a basic, acidic or neutral cleaning composition does not precipitate out of the composition. When the terpolymer is added to the cleaning composition or formulated as an anti fog agent at an effective amount, the terpolymer stays dispersed or dissolved within the formulation, preferably forming clear solutions.

Additional Adjuvants

The cleaning composition may includes additional adjuncts. The adjuncts include, but are not limited to, fragrances or perfumes, chelators, solvents, builders, acids, bases, waxes, dyes and/or colorants, solubilizing materials, stabilizers, thickeners, defoamers, hydrotropes, lotions and/ or mineral oils, enzymes, bleaching agents, cloud point modifiers, preservatives, and other polymers. The waxes, when used, include, but are not limited to, carnauba, beeswax, spermacet, candelilla, paraffin, lanolin, shellac, esparto, ouricuri, polyethylene wax, chlorinated naphthaline wax, petrolatu, microcrystalline wax, ceresine wax, ozokerite wax, and/or rezowax. The solubilizing materials, when used, include, but are not limited to, hydrotropes (e.g. water soluble salts of low molecular weight organic acids such as the sodium and/or potassium salts of xylene sulfonic acid). The acids, when used, include, but are not limited to, organic hydroxy acids, citric acids, keto acid, and the like. Thickeners, when used, include, but are not limited to, polyacrylic acid, xanthan gum, calcium carbonate, aluminum oxide, alginates, guar gum, methyl, ethyl, clays, and/or propylhydroxycelluloses. Defoamers, when used, include, but are not limited to, silicones, aminosilicones, silicone blends, and/or silicone/hydrocarbon blends. Lotions, when used, include, but are not limited to, achlorophene and/or lanolin. Enzymes, when used, include, but are not limited to, lipases and proteases, and/or hydrotropes such as xylene sulfonates and/or toluene sulfonates. Bleaching agents, when used, include, but are not limited to, peracids, hypohalite sources, hydrogen peroxide, and/or sources of hydrogen peroxide.

Preservatives, when used, include, but are not limited to, mildewstat or bacteriostat, methyl, ethyl and propyl parabens, short chain organic acids (e.g. acetic, lactic and/or glycolic acids), bisguanidine compounds (e.g. Dantogard and Dantogard Plus both from Lonza, Inc. and/or Glydant) and/or short chain alcohols (e.g. ethanol and/or IPA).

The mildewstat or bacteriostat includes, but is not limited to, mildewstats (including non-isothiazolone compounds) include Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, Na.sup.+ salt, from Nipa Laboratories Ltd., DOWICIDE A, a 1,2-Benzoisothiazolin-3-one, from Dow Chemical Co., and IRGASAN DP 200, a 2,4,4'-trichloro-2-hydroxydiphenylether, from Ciba Corp.

Absorbent Materials

The cleaning composition of the present invention can be used independently from or in conjunction with an absorbent and/or adsorbent material. For instance, the cleaning composition can be formulated to be used in conjunction with a cleaning wipe, sponge (cellulose, synthetic, etc.), paper towel, napkin, cloth, towel, rag, mop head, squeegee, and/or other cleaning device that includes an absorbent and/or adsorbent material. The cleaning wipe can be made of nonwoven material such as nonwoven, fibrous sheet materials or meltblown, coform, air-laid, spun bond, wet laid, bonded-carded web materials, and/or hydroentangled (also known as spuniaced) materials. The cleaning wipe can also be made of woven materials such as cotton fibers, cotton/nylon blends and/or other textiles. The cleaning wipe can also include wood pulp, a blend of wood pulp, and/or synthetic fibers, e.g., polyester, rayon, nylon, polypropylene, polyethylene, and/or cellulose polymers.

When the cleaning formulation is incorporated in an absorbent material, the cleaning composition may include an effective amount of release agent to increase the amount of polymer released from the cleaning wipe onto a surface. The release agent is preferably an ionic species designed to compete with the polymer for sites on the cleaning wipe thereby causing increased polymer release from the cleaning wipe during use of the cleaning wipe. The release agent may include a salt. A variety of different salts can be used such as, but not limited to, monovalent salts, divalent salts, organic salts, and the like.

During the cleaning procedure, the polymer in the formulation adsorbs onto the surface, forming a thin invisible film that remains after the surface is cleaned. Upon subsequent soiling, the film causes any new soil layers to be easily removed from the surface. In this manner, the polymer of this invention results in easier removal of soil and faster drying, and can also prevent soil from adhering to a surface.

The cleaning composition containing the polymer can take any form that would allow suitable treatment of the hard surface needing to be cleaned. This could include pourable or sprayable liquids, dilutable liquids, creams or pastes, aerosols, liquids that are pre-applied in a wiping product, concentrate, a gel, solid or dry products that must first be combined with water.

Thus the hard surface cleaner containing the inventive polymer may be in the form of a pourable or sprayable liquid, dilutable liquid, cream or paste, aerosol, liquids that are pre-applied in a wiping product, concentrate, gel, solid or dry products that must first be combined with water.

The materials may also be useful in any other applications where hydrophilic surface modification is required to provide a useful effect.

EXAMPLES

Example 1

A one liter reactor is purged with nitrogen. Initial charges of 15.5 g DADMAC (65.9%) solution, 1.34 g acrylamide (50.7%) solution, 0.04 g acrylic acid (99%) solution, 1.5 g of NaEDTA (10%) solution and 270 g of deionized water are added to the reactor. The reaction mixture pH is adjusted to about 4.0+/−0.2 with HCl (5%) solution. The reactants are stirred at 210 rpm and heated to 100° C. A monomer feed is prepared from 6.7 g of DADMAC (65.9%) solution, 109.17 acrylamide (50.7%) solution, 3.25 g acrylic acid (99%) solution and 22.33 g methylenebisacrylamide (0.10%) solution. 5 mL of the monomer feed is initially charged to the reactant mixture. The intiator (ammonium persulfate, 0.2 g in 20 ml water) is introduced at a rate of 0.11 ml/min while the remaining monomer feed is fed over 60 min. The pH is adjusted to about 4.0±0.2 with NaOH solution. After completion of the monomer feed, the container holding the monomer feed is rinsed with 10 mL deionized water and charged to the reactor. Initiator feed is continued at the same rate until complete. The batch is held at 100° C. for an additional 0.5 hr.

A post treatment feed of sodium metabisulfite (1 wt % aqueous solution, 2.6 mL) is added at the rate of 0.3 ml/min until complete. The batch is then maintained at 100° C. for another 0.5 hr followed by the addition of 50 mL of deionized water via the post treatment feed to the reactor. The reactor is cooled and the product is discharged. A terpolymer of acrylamide/diallydimethylammonium/acrylic acid (75.6/20/4.4 respective wt. % monomer content) is produced. The terpolymer carries an excess positive charge, that is the molar ratio of DADMAC to acrylic acid is greater than 1.

Synthesis of Additional Terpolymers

Examples 2-8 and 3 are prepared as in example 1 except the monomer ratios are varied.

| Terpolymer | ACM | DADMAC | AA | Mw, k | Charge (meq/g solid) |
|---|---|---|---|---|---|
| Example 1 | 75.6 | 20 | 4.4 | 100 | 0.18 |
| Example 2 | 75 | 20 | 5 | | −0.05 |
| Example 3 | 87.8 | 10 | 2.2 | | 0.42 |
| Example 4 | 63.4 | 30 | 6.6 | 212 | 0.25 |
| Example 5 | 69.5 | 25 | 5.5 | 220 | 0.23 |
| Example 6 | 70.6 | 25 | 4.4 | 175 | 0.37 |
| Example 7 | 65.6 | 30 | 4.4 | 201 | 1.42 |
| Example 8 | 76.7 | 20 | 3.3 | 187 | 0.39 |
| Commercial[1] | | | | | −11.15 |

ACM = acrylamide
DADMAC = diallydimethylammonium chloride
AA—Acrylic Acid
[1] Commerical terpolymer is Mirapol Surf-S210 available from Rhodia.

APPLICATION EXAMPLES

Compatibility of Terpolymer with Acidic Surface Cleaning Compositions

Example 1 (AAm/DADMAC/AA, 75.6/20/4.4 by weight) and the commercial terpolymer are added to several different acidic cleaning formulations at a level of 0.5% active polymer. The appearance of the resulting formulations (with polymer) is recorded below in Table 1. The commercial terpolymer is incompatible with most of the acidic cleaning formulations.

TABLE 1

Terpolymer in Acidic Formulations

| Acidic Cleaning Formulation | pH | Appearance without Polymer | Appearance with Example 1 | Appearance with Commercial terpolymer |
|---|---|---|---|---|
| Lysol Bathroom Cleaner | 1.5 | clear, colorless | Clear | Cloudy |
| Lysol 4-in-1 All Purpose Cleaner | 3.0 | clear, blue | Clear | Cloudy |
| Comet | 3.1 | clear, colorless | Clear | Cloudy |
| 1% lactic acid/ 1% Tomadol 91-8 (alcohol ethoxylate) | 2.5 | clear, colorless | Clear | Cloudy |
| Scrub Free | 0.8 | clear, colorless | clear | Clear |

Soap Scum Soil Repellency Test—General Procedure
Preparation of Soap Scum Soil.

A solution of 4% potassium oleate and 0.5% sodium stearate is prepared in 300 ml de-ionized water. The solution is stirred with minimal heat until the potassium oleate is dissolved completely. 150 ml of 2.5% $CaCl_2 \cdot 2H_2O$ solution in de-ionized water is then added causing a white precipitate. The mixture is stirred briefly, then 0.36 g methylene blue is added to the 450 ml solution. The solution is stirred until well mixed and filtered through a glass fritted funnel. The solid product is rinsed until the mother liquor becomes a sky blue color or approximately 3 times. The wet solid is transferred to another beaker to which is added approximately 110 ml of de-ionized water. The mixture is stirred with a mechanical stirrer until the slurry reaches a uniform consistency. [The slurry solution is stored in a refrigerator when not in use.]

Soil Rinse-Off Procedure.

2 mL solution of 0.5% polymer in a cleaning formulation is placed onto a 2-inch square paper towel. The paper towel is then wiped up and down on one half of a 10 cm×10 cm white tile (Home Depot) for 30 seconds. The untreated side is wiped with a formulation without polymer using the same application method. The tile is then air dried for 10 minutes, and contact angle measurements are taken. 0.3-0.4 g of soap scum is then applied with a paintbrush by dabbing the soil onto the tile surface using very short strokes. Tiles are air dried for one hour on bench top.

The soiled tiles are then placed under a flowing spray of de-ionized water (flow rate of 30 mL/sec) for two minutes with the tiles held at a 45 degree angle to the stream of water. The water stream is directed at the center of the tile so that the spray pattern hit both sides of the tile in equal amounts. After removing from the water stream, the tiles are air dried and visually evaluated.

Example 2 (AAm/DADMAC/AA, 75/20/5) and example 3 (AAm/DADMAC/AA, 87.8/10/2.2) are dissolved in Lysol Bathroom Cleaner (Reckitt Benckiser) at 0.5% active by weight. A soap scum soil removal test is performed as described above. Results are recorded below in Table 2:

TABLE 2

Soap Scum Removal Results at pH 1.5

| Surface Treatment | Soil Remaining after Cleaning |
|---|---|
| Lysol Bathroom Cleaner (pH = 1.5) | 100% |
| Lysol Bathroom Cleaner + 0.5% polymer of example 2 | 20% |
| Lysol Bathroom Cleaner + 0.5% polymer of example 3 | 0% |

Polymers of example 1 and example 3 are dissolved in Lysol 4-in-1 All Purpose Cleaner (Reckitt Benckiser) at 0.5% active by weight. A soap scum soil removal test is performed as described above. Results are recorded below in Table 3:

TABLE 3

Soap Scum Removal Results at pH 3.0

| Surface Treatment | Soil Remaining after Cleaning |
|---|---|
| Lysol 4-in-1 APC (pH = 3.0) | 100% |
| Lysol 4-in-1 APC + 0.5% polymer of example 2 | 0% |
| Lysol 4-in-1 APC + 0.5% polymer of example 3 | 0% |

Polymer of example 2 is dissolved in Scrub Free Bathroom Cleaner (Church and Dwight) at 0.5% active by weight. A soap scum soil removal test is performed as described above. Results are recorded below in Table 4:

TABLE 4

Soap Scum Removal Results at pH 0.8

| Surface Treatment | Soil Remaining after Cleaning |
|---|---|
| Scrub Free Bathroom Cleaner (pH = 0.8) | 100% |
| Lysol Bathroom Cleaner + 0.5% polymer (AAm/DADMAC/AA, 75/20/5) | 0% |

Polymer of example 3 is dissolved in Comet Bathroom Cleaner (Prestige Brands) at 0.5% active by weight. A soap scum soil removal test is performed as described above. Results are recorded below in Table 5.

TABLE 5

Soap Scum Removal at pH = 3.1

| Surface Treatment | Soil Remaining after Cleaning |
|---|---|
| Comet Bathroom Cleaner (pH = 3.1) | 100% |
| Comet Bathroom Cleaner + 0.5% polymer of example 3 | 0% |

Anti-Fog Test Method

The general procedure for the anti-fog test protocol is described below. The rinse step (d) is optional:
a. Fisherbrand glass microscope slides (75×50×1 mm) are pre-washed with soap and water and rinsed with de-ionized water to remove potential residues.
b. The glass slide is divided into two portions: the left side is coated with polymer-containing formulation solution as treated side; the right side is coated with formulation alone and referenced as untreated side.
c. 2 mL solution of 0.5% polymer-formulation is placed onto a 2-inch square paper towel. The paper towel is then wiped up and down on the surface for 30 seconds to make the coatings. The untreated side is wiped with pure formulation using the same application method.
d. The glass surface is rinsed for 15 seconds with de-ionized water from untreated side to the treated side to remove extra formulation.
e. Once the glass surface is dry, the contact angle is measured.
f. The glass slide is placed on top of a beaker containing 50 mL of de-ionized water at 70° C. water for approximately 15 seconds. The behavior of the water vapor is observed as it condenses on the slide surface. The treated side stays clear if the sample has good anti-fogging effect, while the untreated side forms a heavy fog of condensation.
g. Anti-fog effect is graded in 1-5 scale according to the degree of fogging on glass surface. Samples with an anti-fog score of "5" form a uniform water film on the glass surface which provides a transparent surface.

Anti-Fog Evaluation in Windex Glass Cleaner

Polymer of example 2, 3, 4, 5, 6, 8 and MIRAPOL S210 are dissolved in Windex Original Glass Cleaner (SC Johnson) at 0.5% active material resulting in a clear solution. The anti-fog test is carried out as described above without water rinse, and the results are presented below in Table 6.

TABLE 6

Anti-Fog Effect in Glass Cleaner

| Surface Treatment | Anti-Fog Effect |
|---|---|
| Windex Glass Cleaner (pH = 10.5) | 0 |
| Windex Glass Cleaner + 0.5% polymer of example 2 | 5 |
| Windex Glass Cleaner + 0.5% polymer of example 3 | 5 |
| Windex Glass Cleaner + 0.5% polymer of example 4 | 2.25 |
| Windex Glass Cleaner + 0.5% polymer of example 5 | 4 |
| Windex Glass Cleaner + 0.5% polymer of example 6 | 3 |
| Windex Glass Cleaner + 0.5% polymer of example 8 | 2.25 |
| Commericial Sample[1] | 1.25 |

[1] MIRAPOL S210.

We claim:

1. A hard surface cleaning composition comprising about 0.01 to about 5 wt. % of a terpolymer formed from monomer components consisting of a), b) c) and optionally d)
   wherein a) is defined as
   a monomer having the following structure (I):

a)

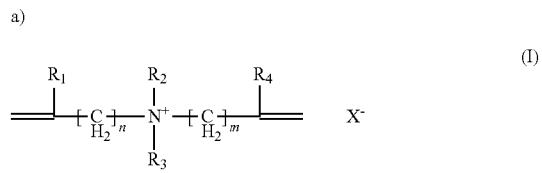

wherein
   $R_1$ and $R_4$ independently represent a hydrogen atom or a linear or branched $C_1$-$C_6$ alkyl group:
   $R_2$ and $R_3$ independently represent an alkyl, hydroxyalkyl or amino alkyl group in which the alkyl group is a linear or branched $C_1$-$C_6$ chain;
   n and m independently represent integers between 1 and 3;
   $X^-$ represents a counterion;
   b) at least one hydrophilic monomer bearing a function of acidic nature which is copolymerizable with (a) and capable of ionizing in the application medium and is selected the from group consisting of acrylic acid and methacrylic acid,
   c) is selected from the group consisting of acrylamide and methacrylamide;
   and
   d) optionally, a crosslinking agent,
   wherein monomer c) makes up at least 60 wt. % based on the total weight of the formed terpolymer
   wherein monomer a) will exceed the molar amount of component b) incorporated into the terpolymer by at least 10 molar% and
   an effective amount of a surfactant for improving cleaning performance.

2. The cleaning composition according to claim 1, wherein the wt. % of monomer a) makes up at least 2 wt. % to 35 wt. % based on the formed terpolymer.

3. The cleaning composition according to claim 1 wherein the wt. % of monomer b) makes up at least 0.4 wt. % to 10 wt. % based on the formed terpolymer.

4. The cleaning composition according to claim 1, wherein the terpolymer includes the component d), the crosslinking agent.

5. The cleaning composition according to claim 1, wherein the crosslinking agent is a divinyl addition monomer and is added at 20 to 10,000 ppms of the total monomer content of the terpolymer.

6. The cleaning composition according to claim 1, wherein the terpolymer average molecular weight ranges from 10,000 to 10,000,000 daltons.

7. A fog preventive film,
   wherein the film is present on a nonporous substrate and the film composition comprises a terpolymer formed from at least one monomer having the following structure (I):

a)

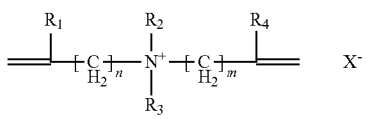 (I)

wherein
$R_1$ and $R_4$ independently represent a hydrogen atom or a linear or branched $C_1$-$C_6$ alkyl group:
$R_2$ and $R_3$ independently represent an alkyl, hydroxyalkyl or amino alkyl group in which the alkyl group is a linear or branched $C_1$-$C_6$ chain;
n and m independently represent integers between 1 and 3;
$X^-$ represents a counterion;
b) at least one hydrophilic monomer bearing a function of acidic nature which is copolymerizable with (a) and capable of ionizing in the application medium and is selected from group consisting of acrylic acid and methacrylic acid;
c) is selected from the group consisting of acrylamide and methacrylamide; and
d) optionally, a crosslinking monomer,
wherein monomer c) makes up at least 60 wt. % based on the total weight of the formed terpolymer wherein the monomer a) will exceed the molar amount of component b) incorporated into the terpolymer by at least 10 molar%.

8. A film according to claim 7, wherein the nonporous substrate is glass or a mirror.

9. A film according to claim 7, wherein the film is transparent.

10. A film according to any one of claim 7, wherein the average molecular weight of the terpolymer ranges from 100,000 to 10,000,000 daltons.

11. A method of cleaning a hard surface comprising the steps of
applying the cleaning composition according to claim 1 in an aqueous carrier, to a hard surface and
rinsing the cleaning composition from the surface.

12. A method of removing limescale and soap scum from a surface comprising
applying the cleaning composition according to claim 1 in an aqueous carrier to a hard surface and
rinsing the cleaning composition from the surface.

13. A method of making a nonporous surface fog resistant which method comprises the steps of
applying the composition according to claim 1 in an aqueous liquid carrier to said surface to obtain a film, and
optionally, rinsing the film from said surface.

14. The method according to claim 11, wherein component a) is diallydimethyl ammonium chloride, component b) is acrylic acid or methacrylic acid and component c) is acrylamide.

15. The cleaning composition according to claim 1, wherein component a) is diallydimethyl ammonium chloride, component b) is acrylic acid or methacrylic acid and component c) is acrylamide.

16. The hard surface cleaner according to claim 1, wherein the hard surface cleaner is in the form of a pourable or sprayable liquid, dilutable liquid, cream or paste, aerosol, liquids that are pre-applied in a wiping product, concentrate, gel, solid or dry products that must first be combined with water.

* * * * *